Patented July 5, 1949

2,474,869

UNITED STATES PATENT OFFICE 2,474,869

MERCURY ACETYLIDE-SILVER NITRATE COMPLEX AND PROCESS OF MAKING SAME

Joseph A. Shaw and Elton Fisher, Pittsburgh, Pa., assignors to Koppers Company, Inc., Pittsburgh, Pa., a corporation of Delaware No Drawing. Application February 7, 1946, Serial No. 646,186

4 Claims. (Cl. 260—430)

This invention relates to acetylene compounds. More particularly the invention relates to a complex compound formed by the reaction of acetylene with silver nitrate and mercuric nitrate.

A strong silver nitrate solution reacts readily with acetylene to form a silver acetylide compound, $Ag_2C_2 \cdot 6AgNO_3$. This silver acetylide compound is quite soluble in the mother liquor ($AgNO_3$), the solubility increasing as the concentration of the liquor increases. In fact a strong silver nitrate solution will easily become supersaturated with the silver acetylide and the acetylide may be held in a supersaturated state for an indefinite period without precipitation.

Coke oven and coal gas contain substantial amounts of acetylene and olefines. Strong silver nitrate solution is a good absorbent for the olefines so that the silver nitrate will absorb the olefines and react with acetylene. The olefines may be removed from the silver nitrate solution by heating it, but an ordinary amount of heating will not drive out the silver acetylide compound from the solution. We have found that the silver acetylide compound, $Ag_2C_2 \cdot 6AgNO_3$ may be completely precipitated from a silver nitrate solution with mercuric nitrate $Hg(NO_3)_2$. The mercuric nitrate forms a new product with the silver acetylide, a complex white crystalline product appearing to have the composition $HgC_2 \cdot 3AgNO_3$. This complex mercury-silver-acetylene compound may be separated from the silver nitrate solution by decantation or filtration.

The primary object of the present invention is to provide a new compound $HgC_2 \cdot 3AgNO_3$, and a process of producing this complex compound.

The silver acetylide compound $Ag_2C_2 \cdot 6AgNO_3$ is preferably made by adding acetylene ($C_2H_2$) to a 31% by weight solution of anhydrous silver nitrate dissolved in aqueous one normal nitric acid. If the solubility ratios are maintained, a clear solution will result.

To separate the silver acetylide from this solution a sufficient quantity of mercuric nitrate to provide mercury to replace the silver of the silver acetylide $Ag_2C_2 \cdot 6AgNO_3$, is added to the silver acetylide solution. The mercury acetylide-silver complex is a very fine-grained white precipitate which is not soluble in the mother liquor and can be separated therefrom by filtration. The individual crystals of the precipitate are scarcely distinguishable at a magnification of 240 diameters. If the mercury-silver complex is separated from the solution and heated, the material will decompose but the decomposition is not explosive in nature. If the decomposed product is further heated metallic silver and mercury will separate. If the paste is suspended in a dilute solution of nitric acid and mercuric nitrate or in a portion of the original silver nitrate solution containing an excess of mercuric nitrate and heated at or near the boiling point, the acetylene is completely decomposed, apparently to $CO_2$ and water together with the brown fumes of oxides of nitrogen.

The mercury acetylide-silver complex has a distinct commercial value in that it affords a cheap and effective means by which acetylene may be removed from gas, and an effective precipitant by which silver acetylide $Ag_2C_2 \cdot 6AgNO_3$, may be separated from a silver nitrate absorption solution. With the process of absorbing the acetylene and then decomposing the acetylide compound, the acetylene may be effectively removed from the gas and destroyed without danger of explosion.

The preferred form of the invention having been thus described, what is claimed as new is:

1. A mercury acetylide-silver complex $$HgC_2 \cdot 3AgNO_3$$

2. A process of making $HgC_2 \cdot 3AgNO_3$ comprising: treating $Ag_2C_2 \cdot 6AgNO_3$ in a strong silver nitrate in acid solution with mercuric nitrate to replace the silver in the $Ag_2C_2$ radical with mercury.

3. A process of making $HgC_2 \cdot 3AgNO_3$ comprising: absorbing acetylene in a strong silver nitrate solution containing nitric acid to form $$Ag_2C_2 \cdot 6AgNO_3$$

treating the $Ag_2C_2 \cdot 6AgNO_3$ with mercuric nitrate to precipitate $HgC_2 \cdot 3AgNO_3$ and filtering to separate the $HgC_2 \cdot 3AgNO_3$.

4. A process of making a mercury acetylide-silver complex $HgC_2 \cdot 3AgNO_3$ comprising treating $Ag_2C_2 \cdot 6AgNO_3$ with sufficient mercuric nitrate $Hg(NO_3)_2$ in nitric acid solution to supply the mercury required to replace the silver of the $Ag_2C_2$ radical of the complex.

JOSEPH A. SHAW.
ELTON FISHER.

REFERENCES CITED

The following references are of record in the file of this patent:

UNITED STATES PATENTS

| Number | Name | Date |
|---|---|---|
| 2,082,569 | Carothers et al. | June 1, 1937 |
| 2,150,349 | Van Peski et al. | Mar. 14, 1939 |

OTHER REFERENCES

Bull. Soc. Ind. (deRouen), vol. 34, p. 417, Dubosc (1907).